United States Patent
Shankar et al.

(10) Patent No.: US 8,627,136 B2
(45) Date of Patent: Jan. 7, 2014

(54) NON-DISRUPTIVE FAILOVER OF RDMA CONNECTION

(75) Inventors: Hari Shankar, San Jose, CA (US); Huadong Liu, Research Triangle Park, NC (US); Hua Li, Research Triangle Park, NC (US)

(73) Assignee: NetApp Inc., Sunnyvale, CA (US)

( * ) Notice: Subject to any disclaimer, the term of this patent is extended or adjusted under 35 U.S.C. 154(b) by 412 days.

(21) Appl. No.: 12/978,866

(22) Filed: Dec. 27, 2010

(65) Prior Publication Data

US 2012/0166886 A1 Jun. 28, 2012

(51) Int. Cl.
*G06F 11/00* (2006.01)

(52) U.S. Cl.
USPC ........... 714/4.11; 709/212; 709/218; 709/217

(58) Field of Classification Search
None
See application file for complete search history.

(56) References Cited

U.S. PATENT DOCUMENTS

| | | | | |
|---|---|---|---|---|
| 7,593,996 B2* | 9/2009 | Gole et al. | ............ | 709/212 |
| 8,041,987 B2* | 10/2011 | Allen et al. | ............ | 714/5.11 |
| 8,233,380 B2* | 7/2012 | Subramanian et al. | ....... | 370/218 |
| 8,244,825 B2* | 8/2012 | Subramanian et al. | ....... | 709/212 |
| 8,244,826 B2* | 8/2012 | Benner et al. | ................ | 709/212 |
| 2002/0071386 A1 | 6/2002 | Gronke | | |
| 2005/0015459 A1* | 1/2005 | Gole et al. | ................... | 709/212 |
| 2008/0126509 A1* | 5/2008 | Subramanian et al. | ....... | 709/214 |
| 2012/0042202 A1* | 2/2012 | Wenzel | ......................... | 714/6.3 |

OTHER PUBLICATIONS

Int. Search Report cited in PCT Application No. PCT/US2011/067378 dated Apr. 4, 2013, 20 pgs.

* cited by examiner

*Primary Examiner* — Christopher McCarthy
(74) *Attorney, Agent, or Firm* — Cooper Legal Group LLC

(57) ABSTRACT

A novel RDMA connection failover technique that minimizes disruption to upper subsystem modules (executed on a computer node), which create requests for data transfer. A new failover virtual layer performs failover of an RDMA connection in error so that the upper subsystem that created a request does not have knowledge of an error (which is recoverable in software and hardware), or of a failure on the RDMA connection due to the error. Since the upper subsystem does not have knowledge of a failure on the RDMA connection or of a performed failover of the RDMA connection, the upper subsystem continues providing requests to the failover virtual layer without interruption, thereby minimizing downtime of the data transfer activity.

25 Claims, 10 Drawing Sheets

| QS ID 535 | QS STATE 540 | QS QUEUES 550 |
|---|---|---|
| QS #1 | CONNECTED ACTIVE | SEND QUEUE<br>RECEIVE QUEUE<br>COMPLETION QUEUE: EMPTY |
| QS #2 | CONNECTED STANDBY | SEND QUEUE<br>RECEIVE QUEUE<br>COMPLETION QUEUE |
| QS #3 | ERROR | SEND QUEUE<br>RECEIVE QUEUE<br>COMPLETION QUEUE |
| ... | ... | ... |

FIG. 5B

NON-DISRUPTIVE FAILOVER OF RDMA CONNECTION

FIELD OF THE INVENTION

Embodiments described herein relate generally to computer systems and more particularly to non-disruptive failover of Remote Direct Memory Access (RDMA) connection.

BACKGROUND

RDMA technology reduces processor workload in the transmission and reception of data across a network between two computer nodes by transferring data directly from memory of local computer node to memory of a remote computer node without involving remote node CPU. RDMA technology is typically implemented by a specialized hardware which resides on each computer node. An RDMA write operation transfers data from the memory of a local computer node directly to the memory of a remote computer node; an RDMA read operation requests transfer of data from the memory of a remote computer node directly to the memory of local computer node. Each RDMA connection uses a pair of memory data structures, a send queue and a receive queue, that allows the computer node to post work requests to the RDMA capable hardware. There is also a completion queue that stores completion notifications for the submitted work requests. A send queue, a receive queue and a completion queue are referred to as a queue structure (QS) throughout this document. Once the RDMA connection is established, a computer node can post a request in a queue (send or receive queue). Each queue stores a request from the time it is posted by the node until the time it is processed. An interconnect adapter on the node is then notified by an interconnect driver on the same node that the request is posted. It reads the request in the queue and does the actual data transfer over a network. After the data are received, the interconnect adapter at the computer node that receives the data writes data directly to destination memory at the second computer node. Then a completion result is sent back to the first computer node. The interconnect adapter at the first computer node posts the result to its completion queue.

According to RDMA protocols and known implementations, when an error occurs in a queue structure (QS), all pending requests in the QS are flushed and returned in error. Then QS management logic destroys the QS in error and creates a new QS for the purpose of establishing a new connection. The error status is communicated to an upper subsystem module (such as a file system, for example), which stops posting requests until the new QS is created. This, in turn, disrupts operation of the applications using the RDMA connection. Accordingly, it is highly desirable to maintain RDMA connection between two or more computer nodes barring legitimate error cases, e.g.—transient software or hardware errors when processing an I/O request.

One useful application of RDMA technology is controller failover in a cluster storage environment in which a first computer node may have a predetermined failover "partner" node (a second computer node) that may take over or resume storage services of the first computer node upon failure at the first computer node. For received write requests from a client (s), a node may produce write logs and store them in its non-volatile storage device (from which, the node may at a later time flush the write logs to the storage devices). To ensure data consistency and provide high data availability, the write logs may also be stored remotely to a non-volatile storage device at a partner node. The transfer of write logs between two partner nodes in a cluster storage system typically takes place using the RDMA technology so that data in a local non-volatile storage device at a first computer node may be transferred directly to a non-volatile storage device of a second computer node to provide failover protection (e.g., in case the first computer node crashes).

Currently, when an error occurs on an RDMA connection (for example, during the transfer of write logs to a partner node), the error status is communicated to the upper subsystem on the first computer node. Since the RDMA connection is in error, the first computer node no longer transfers the write logs to its partner node, thereby making the logs unsynchronized. As a result, high availability functionality is no longer available to the clients accessing the nodes. As a corollary to this, one computer node can no longer initiate takeover of its partner node, thereby causing disruption to the clients when something happens to either one of the nodes. Accordingly, it is desirable to significantly increase RDMA connection uptime between the nodes for purposes of RDMA transfer.

SUMMARY

Embodiments described herein provide a novel failover technique that minimizes disruption to upper subsystem modules (executed on a computer node), which create requests for data transfer. A new failover virtual layer performs failover of an RDMA connection in error between one or more computer nodes so that the upper subsystem that created a request does not learn about a failure (other than the physical link failure or unrecoverable hardware failure) on the RDMA connection. Since the upper subsystem does not have knowledge of a failure on the RDMA connection or of a performed failover of the RDMA connection, the upper subsystem continues providing requests to the failover virtual layer without interruption, thereby minimizing downtime of the data transfer activity. Embodiments described herein provide non-disruptive failover for errors, which can be recoverable in software and hardware. For example, when I/O processing rate is slower than incoming I/O request rate and a send or receive queue cannot accommodate more I/O requests, a new failover virtual layer can provide additional request buffering to alleviate this problem.

More specifically, according to one embodiment described herein, the new failover virtual layer creates virtual queue structures (QS) in memory on a computer node. The term QS as used herein includes a send queue, a receive queue, and a completion queue. The queue structure is identified by memory addresses. While the memory addresses of the virtual queue structure are provided to the upper subsystem modules via QS handles, these addresses are not provided to an interconnect adapter that performs transfer of data over the RDMA connection. The failover virtual layer also creates physical queue structures in memory, each queue identified by a memory address. In contrast to the virtual queue structures, the memory addresses of the physical queue structures are not provided to the upper subsystem modules while they are provided to the interconnect adapter that performs transfer of data over the RDMA connection. The new failover virtual layer associates a virtual queue structure with one or more physical queue structures. Thus, while in conventional approaches, memory addresses of physical queue structures are provided to the interconnect adapter, which uses them to access the physical queue structures. According to the novel virtual failover technique, the memory addresses of virtual queue structures are not provided to the interconnect adapter.

When a failure occurs on an RDMA connection (such that a request cannot be posted on a physical queue structure for various reasons) the failover virtual layer marks in error the physical queue structure storing a request. In addition, the result of the transmission (e.g., failure) is posted to a completion queue corresponding to the physical queue structure. Importantly, since the upper subsystem module is not provided with the memory addresses of the physical queue structure and completion queue, the upper subsystem module is not aware of the failure. As a result, the upper subsystem continues posting requests to the failover virtual layer without interruption.

The failover virtual layer identifies a second physical queue structure that is not in error and moves outstanding requests from the physical queue structure in error to the second physical queue structure. Once the requests are moved to the second physical queue structure and data are successfully transferred over the RDMA connection, the result of the completion (i.e., success) is posted to a completion queue of the second physical queue structure. The failover virtual layer then moves the "successful" completion status to completion queue of the virtual queue structure. At this point, the upper subsystem becomes aware of the successful completion of the request. Thus, the failover virtual layer makes the upper subsystem immune from the failure occurring on an underlying RDMA connection. The novel failover virtual layer advantageously helps to increase high availability uptime between nodes in a cluster environment when an error occurs on RDMA connection. Since the failover can be performed transparently to the upper subsystem modules, these modules continue posting requests to the failover virtual layer without being aware of the error. As a result, synchronization of the write logs is continued between two or more nodes in a cluster and the nodes can provide high availability functionality to clients without interruption.

Other applications of the inventive techniques include non-disruptive failover of RDMA connection involving sending status information between two computer nodes in a cluster. Such a transmission can be performed using RDMA connection directly from a memory location of a first storage node to a memory location of its partner node over a network. Other uses of the novel techniques involve non-disruptive RDMA transfer of data blocks between two or more nodes in a cluster. Thus, the inventive failover virtual layer provides for non-disruptive failover of an RDMA connection regardless of the nature of the RDMA transfer.

BRIEF DESCRIPTION OF THE DRAWINGS

One or more embodiments of the present invention are illustrated by way of example and not limitation in the figures of the accompanying drawings, in which like references indicate similar elements and in which:

FIG. 5B is a block diagram of an exemplary data structure for storing information about physical queue structures according to inventive embodiments described herein;

DETAILED DESCRIPTION

Cluster Environment

Figure 1:
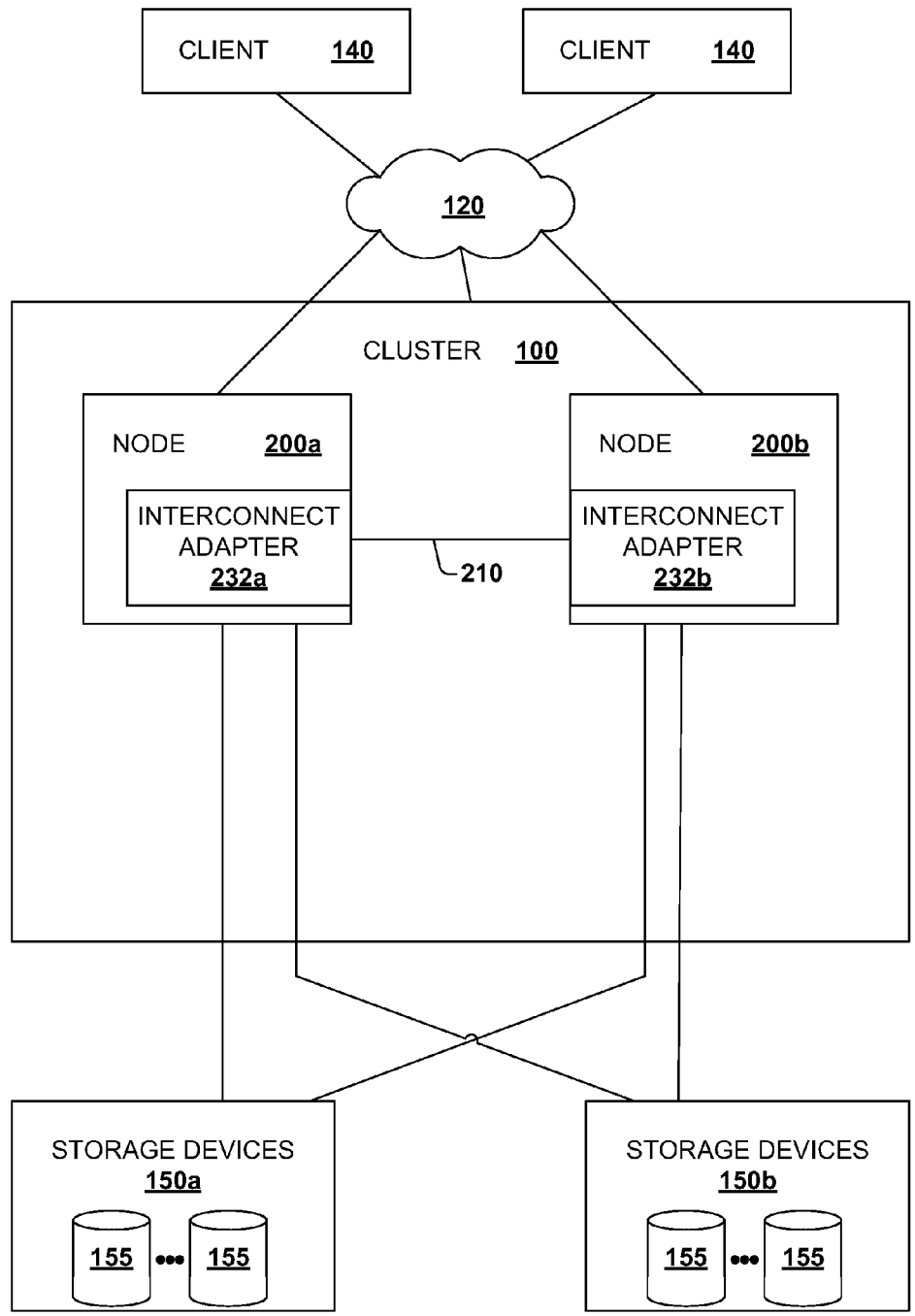
FIG. 1 is a schematic block diagram of an exemplary cluster environment in which some embodiments operate.

FIG. 1 illustrates a block diagram of one embodiment of an environment including a cluster 100 configuration. Those skilled in the art would understand that the cluster environment is shown in order to describe one possible application of the inventive techniques for providing a failover mechanism of an RDMA connection. The novel techniques can be implemented in any environment supporting RDMA transfer between a first and a second computer node over a network. Those skilled in the art would understand that the novel techniques can be implemented in an N-way system among two or more nodes. The cluster system configuration includes nodes 200a and 200b coupled by a dedicated high performance interconnect, e.g. 210, which implements RDMA data transmission, using, for example, InfiniBand, or iWARP (Internet Wide Area RDMA Protocol) with different RDMA architectures such as the Virtual Interface Architecture (VIA) or Open Fabrics Alliance architecture (OFA). For ease of description, node 200a is said to be a source node and node 200b is said to be a target node. Data can be transferred over interconnect 210 using RDMA protocol.

Each node is configured for providing data access services to clients connected with the node. When a failure occurs within node 200a so that node 200a is no longer capable of processing access requests for clients 140, the partner node 200b is configured to automatically resume or take over the data-access service functions provided by the failed node 200a. As such, when a node failure occurs, access requests sent from clients 140 to the failed node 200a may be redirected to the partner node 200b for processing and execution. Note that failure of a node may occur unintentionally or intentionally (e.g., where a node is taken offline for servicing). Those skilled in the art would understand that although FIG. 1 illustrates one pair of partner nodes 200a and 200b, the cluster configuration may include more than one such pair, or the cluster configuration may have "N" interconnected nodes, where N is an integer greater than one. Continuing with the description of FIG. 1, in one embodiment, the nodes 200a and 200b may be storage servers in a storage server cluster. Alternatively, other types of nodes in cluster configurations may be used. The node 200a is coupled to storage devices 150a, which includes multiple storage devices (e.g., disks). It should be noted that while node 200a is connected to storage devices 150a, node 200a is also connected to and capable of reading to and from storage devices 150b since it is a partner node of node 200b. Similarly, while node 200b is connected to storage devices 150b, it is also connected to and is capable of reading to and from storage devices 150*a*. The node 200*b* is coupled to storage devices 150*b*, which includes multiple storage devices (e.g., disks). Storage devices 150*a* and 150*b* can be disks, solid state storage devices, such as flash memory, non-volatile storage device (NVRAM), Magnetic Random Access Memory (MRAM), Phase Change RAM (PRAM), etc. The storage devices can be organized as one or more RAID groups.

The nodes 200*a* and 200*b* are also coupled through a network 120 to a number of clients 140 (hereinafter simply "clients"). The nodes 200*a* and 200*b* receive and respond to various read and write requests from the clients 140, relating to volumes, directories, LUNs, files, blocks, objects, and/or other units of data stored in (or to be stored in) the storage devices 150*a* and 150*b*. The clients 140 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. The clients may also submit requests by issuing packets using block-based access protocols, such as the Small Computer Systems Interface (SCSI) protocol encapsulated over TCP (iSCSI) and SCSI encapsulated over Fibre Channel (FCP). Nodes 200*a* and 200*b* are capable of providing clients with both file-level access and block-level access. Each of the clients 140 may be, for example, a conventional personal computer (PC), workstation, or the like. Network 120 may be, for example, a local area network (LAN), a metropolitan area network (MAN), a virtual private network (VPN), a wide area network (WAN), a global area network (GAN) such as the Internet, or other type of network or combination of networks. The network 120 may implement, for example, Ethernet protocol, Fibre Channel Protocol (FCP), or another protocol or a combination of protocols.

As described earlier, the interconnect connection between the two or more nodes (i.e. Interconnect 210) can be disrupted for various reasons, such as when an input/output (I/O) processing rate is slower than the incoming I/O workload, which means that the requests cannot be posted to send or receive queues. If the interconnect connection between the two or more nodes is disrupted, the logs at the local node are no longer mirrored to the partner node, thereby making high availability functionality no longer available. As a consequence, when one node is no longer able to process write or read requests from clients, a partner node can no longer initiate a takeover due to the disrupted interconnect connection, thereby causing disruption to the clients. As illustrated in FIG. 1, each node in the cluster includes an interconnect adapter 232 (RNIC), which implements RDMA protocol. Using the RNIC, a source node (e.g., node 200*a*) initiates a connection with its partner node (such as target node 200*b*), while the partner node accepts the connection. The RNIC may enable a RDMA read, RDMA write and send/receive operations. For example, an RDMA write operation transfers data from a memory, e.g., 224 (shown in FIG. 2) of one node (e.g., node 200*a*) to a memory of a partner node (e.g., node 200*b*).

To ensure data consistency and provide high data availability, data in a non-volatile storage device at a source node may be mirrored to a target non-volatile storage device of a target node. To this end, node 200*a* may further mirror the write logs in local log cache 170 to remote log cache (shown in FIG. 2) for guaranteeing completion of write requests on storage devices. When node 200*a* is not able to accept read/write requests, node 200*b* may then access log cache on node 200*b* to execute any remaining write operations uncompleted by node 200*a*. Consistency between log caches 170 is thus desirable to enable completion of write requests on storage devices 150.

Components of a Node

Figure 2:
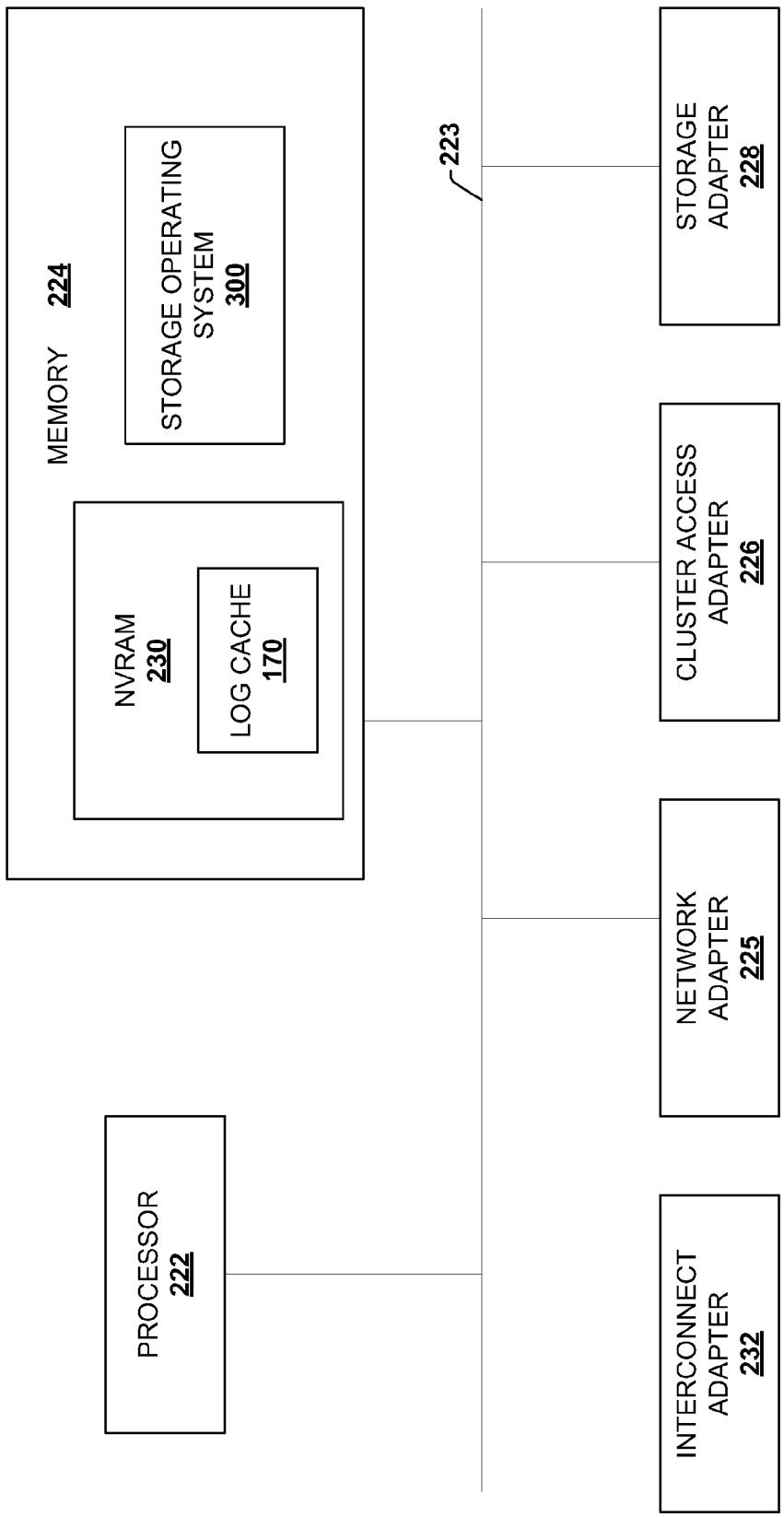
FIG. 2 is a schematic block diagram of various components of an exemplary node shown in FIG. 1.

FIG. 2 is a schematic block diagram of an exemplary node 200*a* or 200*b* that may be implemented in cluster 100. Node 200*a* may illustratively be embodied as a storage system comprising a processor 222, a memory 224, a network adapter 225, a cluster access adapter 226, a storage adapter 228 and non-volatile storage, e.g., NVRAM 230. These components can be interconnected by a system bus 223. Direct memory transmission between two or more nodes can be performed using an interconnect adapter (or device) 232, which can be implemented as a RDMA enabled remote network interface card (RNIC) supporting RDMA protocol.

Network adapter 225 comprises a plurality of ports adapted to couple node 200 to one or more clients 140 over point-to-point links, wide area networks, virtual private networks implemented over a public network (Internet) or a shared local area network. Network adapter 225 thus may comprise the mechanical, electrical and signaling circuitry needed to connect the node to the network. Each client 140 may communicate with node 200 over network 120 by exchanging discrete frames or packets of data according to pre-defined protocols, such as TCP/IP.

Cluster access adapter 226 may comprises a plurality of ports adapted to couple a pair of partner nodes 200*a* and 200*b* to other pairs in the cluster through a cluster switching fabric, which is not shown in FIG. 1 or FIG. 2. In the illustrative embodiment, Ethernet is used as the clustering protocol and interconnect media, although it will be apparent to those skilled in the art that other types of protocols and transports may be utilized within the cluster architecture described herein.

Storage adapter 228 cooperates with storage operating system 300 stored in memory and executed by processor 222 to access data requested by clients 140. Storage of data of storage devices can be organized as one or more volumes that comprise a collection of e.g., disks. The disks within a volume/file system are typically organized as one or more groups, wherein each group may be operated as a Redundant Array of Independent (or Inexpensive) Disks (RAID).

Memory 224 illustratively comprises storage locations that are addressable by the processor 222 and adapters 225, 226, 228 for storing program instructions and data in some embodiments. The processors and adapters may, in turn, comprise processing elements and/or logic circuitry configured to execute the instructions and manipulate the data stored in memory 224. In some embodiments, memory 224 may comprise a form of random access memory (RAM) comprising "volatile" memory that is generally cleared by a power cycle or other reboot operation.

Storage operating systems 300, portions of which are typically resident in memory 224 and executed by the processing elements, functionally organizes node 200 by invoking operations in support of the storage services implemented by the node. It will be apparent to those skilled in the art that other processing and memory means, including various computer readable media, may be used for storing and executing program instructions pertaining to the invention described herein. In some embodiments, the storage operating system 300 comprises a plurality of software layers that are executed by processor 222. These software layers are described in more detail in reference to FIG. 3B.

Nov-volatile storage element, such as NVRAM 230 locally stores information relating to access requests from clients 140. Preferably, NVRAM may be implemented to store write logs corresponding to write requests from clients 140 in the event of a system shutdown or other unforeseen problem. To that end, write logs may be generated by storage operating system 300 upon receipt of a write request from client 140 for carrying out the requested write operation at a later time. All or a predetermined portion of NVRAM may thus be implemented as a log cache 170 for storing write logs for deferred write requests. Log cache can be stored on other type of media or device suitable for storing instructions and data thereon.

Interconnect adapter (device) 232 may be implemented as a RNIC to support RDMA operations defined by the RDMA protocol. RNIC at each node typically implements the RDMA protocol. Interconnect adapter can be a commercially available product.

At this point, it is useful to describe how a typical RDMA connection is established to transfer data between two computing devices, such as storage systems 200*a* and 200*b*. Such a connection may be established, for example, in order to send write logs between the storage systems. To assist with the understanding how a typical RDMA transfer takes place over an established RDMA connection, FIG. 3A is provided.

Figure 3A:
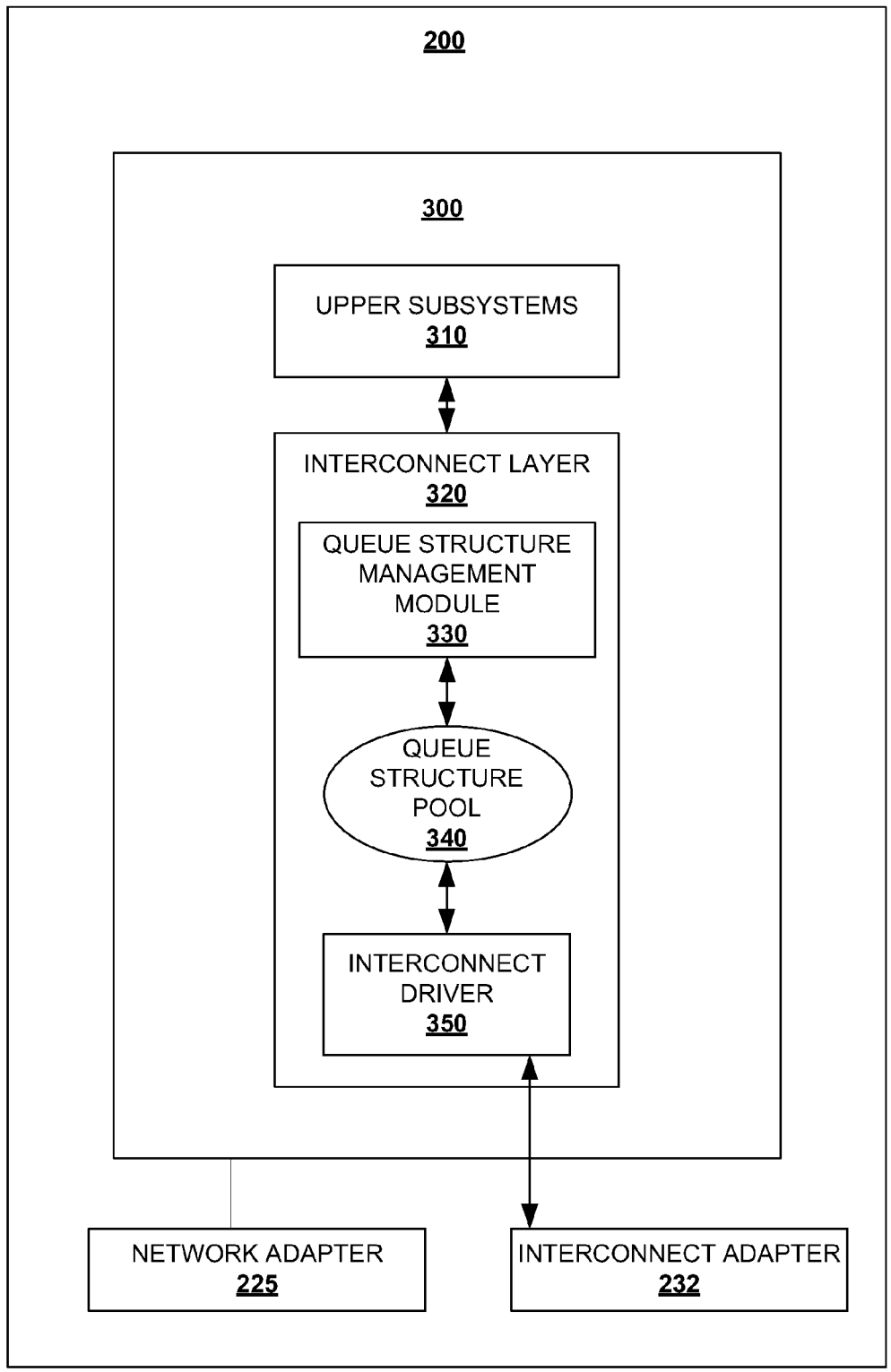
FIG. 3A is a schematic block diagram of the software and hardware components used to perform RDMA transfer according to prior art techniques.

FIG. 3A illustrates various components of a computer node (such as node 200 shown in FIG. 1) used to establish RDMA connection between two or more nodes according to known implementations. FIG. 3A illustrates various modules executed in the operating system 300. These modules are upper subsystem 310 modules and an interconnect layer 320. The upper subsystem modules 310 may include a file system (which can be implemented as a Write Anywhere File System (WAFL) provided by NetApp, Inc. of Sunnyvale, Calif.), a redundant array of inexpensive disks (RAID) subsystem, or any other subsystem that creates a data request, which is provided to the interconnect layer 320). The interconnect layer 320 of the operating system 300 may include the following components: a queue structure (QS) management module 330, a pool of physical queue structures 340, and an interconnect driver 350. Queue structure management module 330 is responsible for creating physical queue structures (which include a send queue, a receive queue, and a completion queue), in response to a request from the upper subsystem 310. An exemplary queue structure is shown in FIG. 4 and described below in reference to FIG. 4. As will be described in more detail below, queue structure management module 330 is also responsible for connecting the queue structures at a first computer node with queue structures at a second computer node connected over a network. Physical QS pool 340 is essentially a number of physical queue structures created by a QS management module 330 under direction of a module in the upper subsystem 310. Each request is stored in the send queue or receive queue from the time it is posted by the QS management module until the time it is processed. The memory needed to create a physical queue structure may be allocated from the node's memory (e.g., 224) or from any other accessible resources by the interconnect adapter. The allocated memory addresses are usually contiguous. Physical QSs should be distinguished with virtual QSs, which are created by a novel failover virtual layer (shown in FIG. 3B). A notable distinction between a physical queue structure and a virtual queue structure in that while the memory addresses of a physical queue structure are provided to the interconnect adapter 232, which can access requests from the physical QS, the memory addresses of a virtual queue structure are not provided to the interconnect adapter, as will be described in greater detail below. The virtual QSs are accessible only to the upper subsystem via QS handles, which means that the memory handles of the VQS are provided to the upper subsystem. In conventional approaches, memory addresses of physical queue structures are provided to the interconnect adapter, which uses them to access the physical queue structures. According to the novel virtual failover technique, the memory addresses of virtual queue structures are not provided to the interconnect adapter.

Still with reference to FIG. 3A, the operating system 300 further includes an interconnect driver 350 configured to manage the interconnect adapter 232. Interconnect driver 350 is responsible for establishing connection between the two or more nodes and notifying the upper subsystem that the connection is established. As part of setting up the connection, physical QSs are created at the second computer node.

It is now useful to describe how a typical RDMA connection is established according to existing known techniques. Initially, the upper subsystem initiates a call to the QS management module to create physical QSs in memory, e.g., 224. Thus, creating the QSs essentially means creating data structures in memory and providing addresses of QSs in memory to the interconnect adapter. The QS management module then instructs the interconnect adapter to connect physical QSs at the source node with the physical QSs at the destination node by exchanging information, as defined by the RDMA protocol. As part of this procedure, physical QSs may be created at the target node if they are not already present.

After the connection is established, the upper subsystem may send an RDMA write request to the QS management module. The request includes a source address (location in memory from which data to be transferred) and a destination address (location in memory where data to be stored as part of the RDMA operation). The QS management module posts the request into the physical send queue. Posting the request essentially means recording the request in a memory location (send queue in this case). The queue structure management module notifies the interconnect adapter, e.g., 232, at the source node, that a new request is posted to the QS. Once the interconnect adapter receives notification, it uses the memory addresses of the QS to access the request. From the request, it identifies memory location of the data. The interconnect adapter accesses the data in memory (in the example of mirroring write logs between two storage systems, the data may include the write logs to be mirrored at the partner storage system). The interconnect adapter sends the data along with the destination addresses to the second computer device.

When the request arrives at the second computer device, e.g., 200*b*, the interconnect adapter (e.g., 232 shown in FIG. 1) at 200*b* reads the destination address from the request and stores the data to the destination address in memory.

Interconnect adapters at the storage systems 200*a* and 200*b* are capable to communicate with each other using the RDMA protocol. The interconnect adapter at the storage system 200*a* receives a completion status from the target partner node. Completion status can be marked as "successful" or "failure", for example. The status is posted into the completion queue associated with a physical QS where the request was posted.

As described herein, when an error occurs on the RDMA connection, the queues are transitioned to an error state so that all outstanding requests are returned in error to the completion queue, thereby disabling RDMA connection. The upper subsystem then instructs the interconnect layer to create a new QS and tries to reestablish the connection after the failure is observed. In the meantime, the upper subsystem stops creating new requests until the new connection is established. All failed requests and any additional requests are sent over the new connection. To minimize the downtime of the RDMA connection and minimize disruption to the upper protocol modules, the novel failover virtual layer is provided, as described below.

Failover Virtual Layer

Figure 3B:
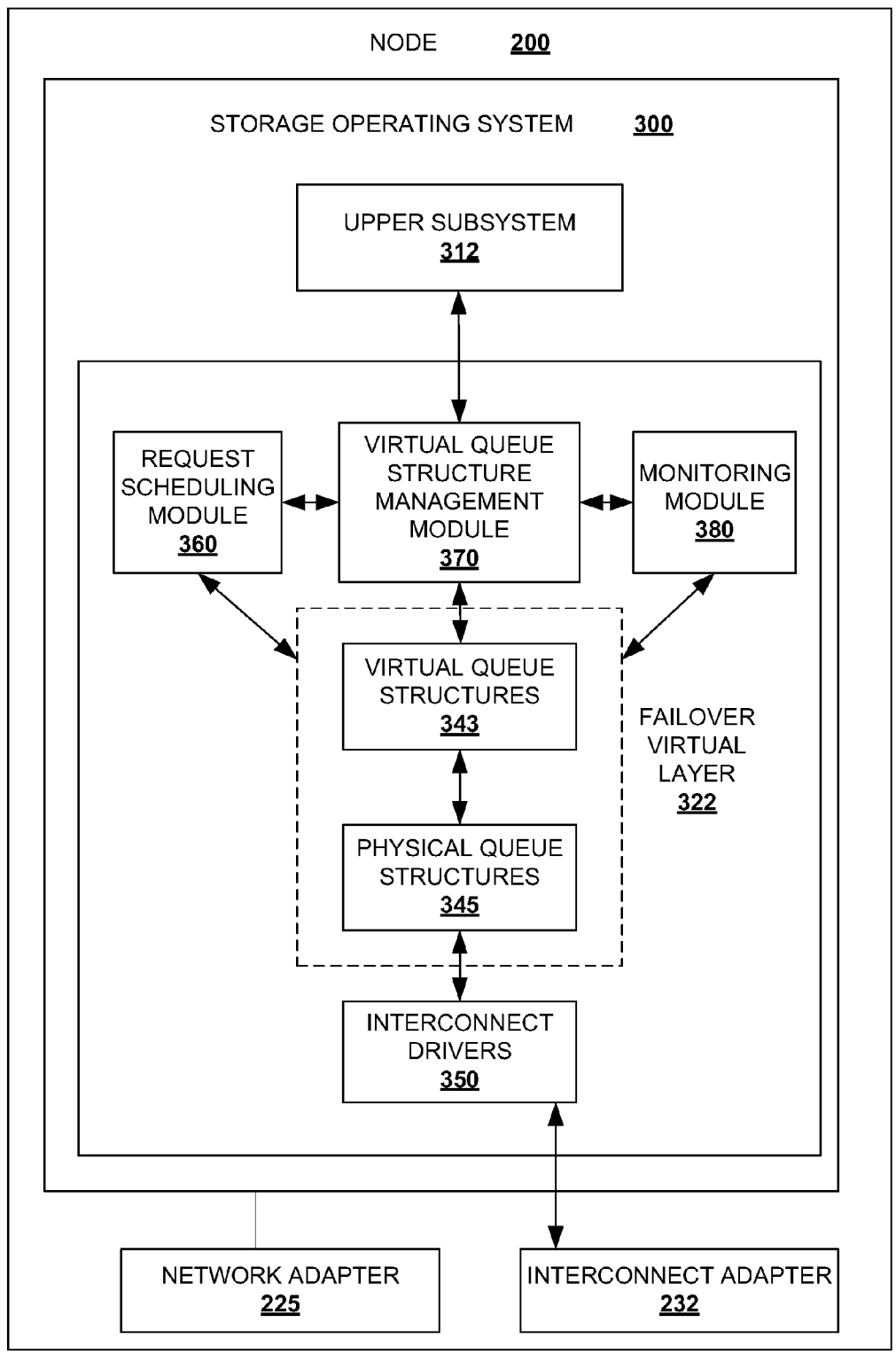
FIG. 3B is a schematic block diagram of the software and hardware components to perform RDMA failover according to inventive embodiments described herein.
Figure 4:
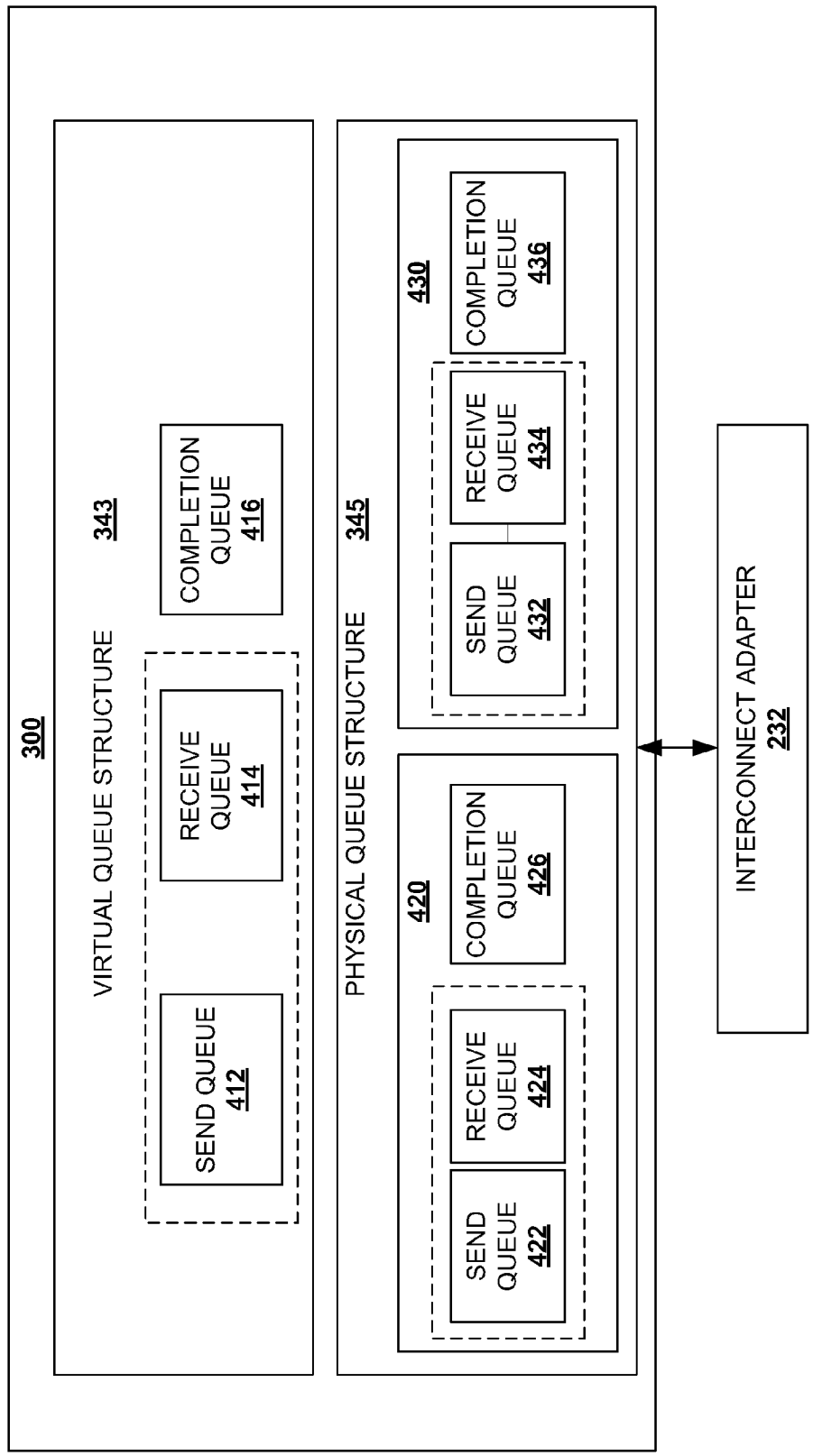
FIG. 4 is a block diagram of various queues in the virtual queue structures and physical queue structures according to inventive embodiments described herein.

FIG. 3B illustrates node 200 executing operating system 300, which in turn includes a novel failover virtual layer 320 configured to minimize disruption to the upper subsystem modules. As illustrated in FIG. 3B, upper subsystem 312 communicates with the failover virtual layer 322 by creating requests and providing the requests to the failover virtual layer. Upper subsystem also receives completion results from the failover virtual layer 322. Thus, failover virtual layer 322 is an intermediary between the upper subsystem and the interconnect adapter.

Failover virtual layer 322, in turn, includes the following components: a virtual queue structure management module 370, a monitoring module 380, a request scheduling module 360, and an interconnect driver 350. Importantly, the failover virtual layer 322 creates virtual QSs 343 and physical QSs 345, as described herein.

Upper subsystem 312 may be a file system (which can be implemented as a Write Anywhere File System (WAFL) provided by NetApp, Inc. of Sunnyvale, Calif.), a redundant array of inexpensive disks (RAID) subsystem, or any other subsystem that creates requests for data transfer and provides them to the failover virtual layer.

Virtual queue structure management module 370 is configured to create virtual QSs and physical QSs. Addresses of physical QSs are registered with the interconnect adapter, which means they are communicated to the interconnect adapter. As such, physical QSs are accessible to the interconnect adapter. Addresses of virtual QSs are not communicated to the interconnect adapter, thereby "hiding" the virtual QSs from the interconnect adapter. Virtual QS management module is further configured to perform failover of RDMA connection when an error is detected on an existing RDMA connection. Importantly, the failover is performed in such a way that the upper subsystem is not aware of the error. Virtual QS management module further maintains information about virtual QSs and physical QSs. Virtual QS management module 370 interacts with the request scheduling module 360a and monitoring module 380. Module 370 communicates with the interconnect adapter 232 via interconnect drivers 350. For example, module 370 passes to interconnect driver 350 address of a physical QS where a request(s) is posted. The interconnect adapter uses this information to access the request from the QS, access data in the memory where the data are stored, and perform RDMA transfer of the data over the interconnect.

Request scheduling module 360 of the failover virtual layer 322 is configured to select a physical queue structure where a request should be posted. Module 360 is responsible for moving the requests from a virtual QS to the physical QS as well as moving a completion status from the physical QS to the virtual QS. Scheduling module 360 is also configured to load balance the requests among physical QSs. According to novel techniques described herein, physical queue structures can be active and standby. An active queue structure is a queue structure where the request is posted for transmission while a standby queue structure is a queue structure that does not have a request queued to it. Those skilled in the art would understand that requests can only be posted to active queue structures. Thus, module 360 is configured to identify available active physical queue structure by, for example, querying a data structure in memory, which maintains information about physical queue structures (e.g., data structure 500 and 502 shown in FIG. 5). A decision as to which queue structure to choose can be based, for example, on the work load of a queue structure, capability of a queue structure, as well as other factors. When a request is sent from the upper subsystem module to a virtual queue structure, the request scheduling module is configured to determine which physical queue structure should store the request. Interconnect driver 350 is responsible for managing interconnect adapter(s) and for passing communication between physical queue structure pool and the interconnect adapter.

Monitoring module 380 is responsible for monitoring physical queue structures to determine if a queue structure is in the error state. If the physical queue structure is in the error state, monitoring module 380 notifies VQS management module 370 so that it won't be used by the scheduling module 360 for posting a new request.

Virtual QSs 343 are data structures created in memory by the virtual QS management module 370. Referring now to FIG. 4, which illustrates exemplary virtual QS in more detail. An exemplary virtual QS, in one implementation, can have a send queue 412, a receive queue 414, and a completion queue 416. Send queue is a queue where module 360 posts requests to do RDMA read, write and send operations; a receive queue 414 is where module 360 posts receive requests, and a completion queue 416 is where the completion results are posted. Exemplary completion results can be "success" and "failure". Each queue can have a number of buffers, each buffer, for example, can store a request. A queue can be identified by an address in memory. Such address is provided to the upper subsystem via the QS handle. Importantly, an address of a virtual QS is not provided to the interconnect adapter, thereby preventing the interconnect adapter from directly notifying the virtual QS about the completion status. As such, the VQS are not accessible to the interconnect adapter. Upon creation of the virtual QS, virtual QS management module provides a receive size and a transmit size of its queues. The size of a queue essentially indicates the number of send or receive requests that can be posted to a queue. Virtual QSs are used by virtual QS module to post the requests prior to posting them to the physical QSs, thereby acting as buffers for requests prior to them being posted to the physical QS. Any number of virtual QSs can be created as long as the memory capacity permits.

Physical QSs 345 are data structures created in memory by the virtual QS module. As demonstrated in FIG. 4, an exemplary physical QS can have a send queue 422, a receive queue 424, and a completion queue 426 where the completion results, such as "success" or "failure" are posted. Each physical queue can have a number of buffers, each buffer, for example, can store a request. A queue can be identified by an address in memory. Such an address is provided to an interconnect adapter on the node where the QSs are created. Importantly, the addresses of physical QSs are not provided to the upper subsystem module, thereby making the upper subsystem unaware of a potential failure in the physical QS. Upon creation of the physical QS, virtual QS management module provides a receive size and a transmit size of its queues. A virtual QS can be associated with more than one physical QS. Thus, although FIG. 4 illustrates only two physical QSs, any number of physical QSs can be created.

Figure 7:
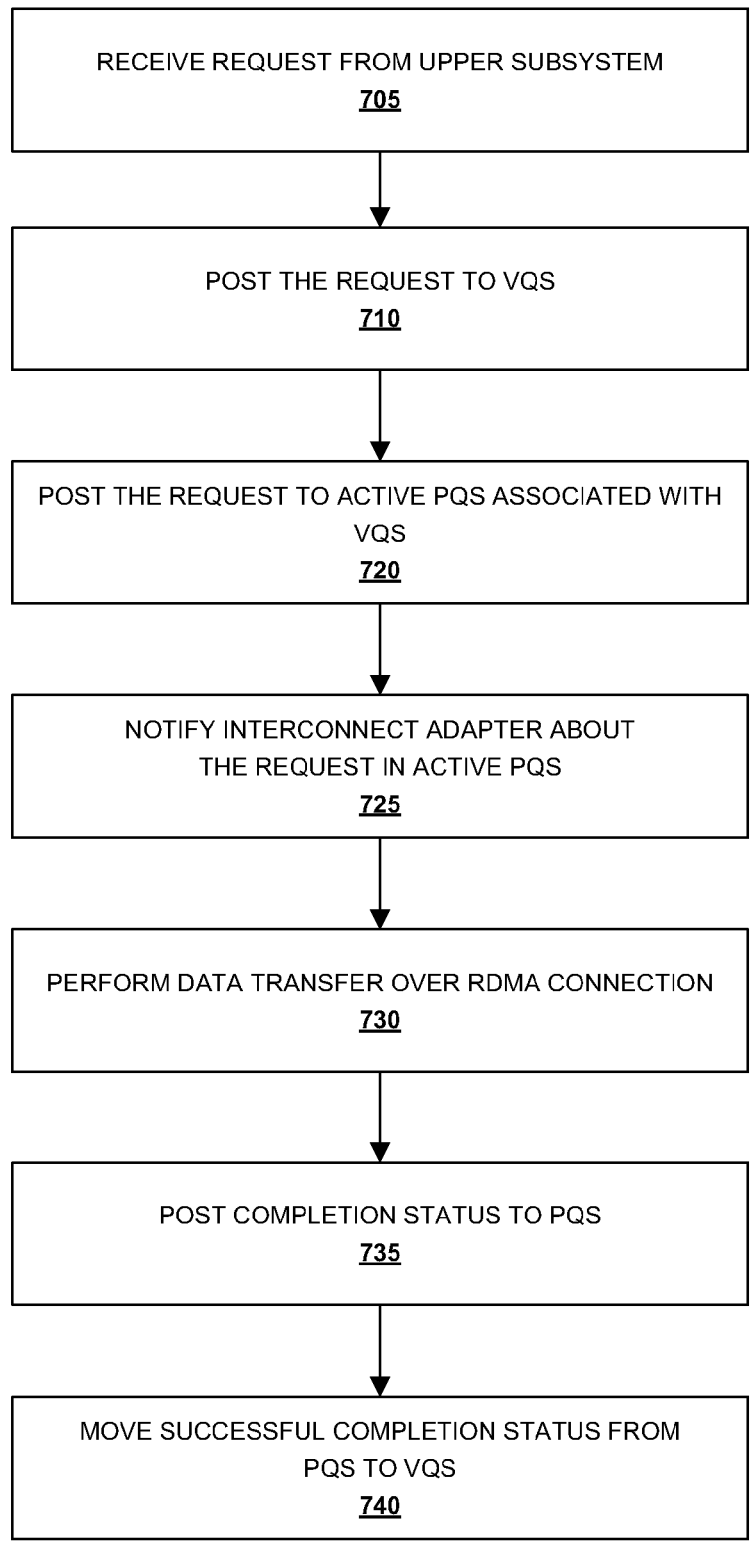
FIG. 7 is a flow diagram illustrating transfer of data between two nodes shown in FIG. 1 according to inventive embodiments described herein.
Figure 8:
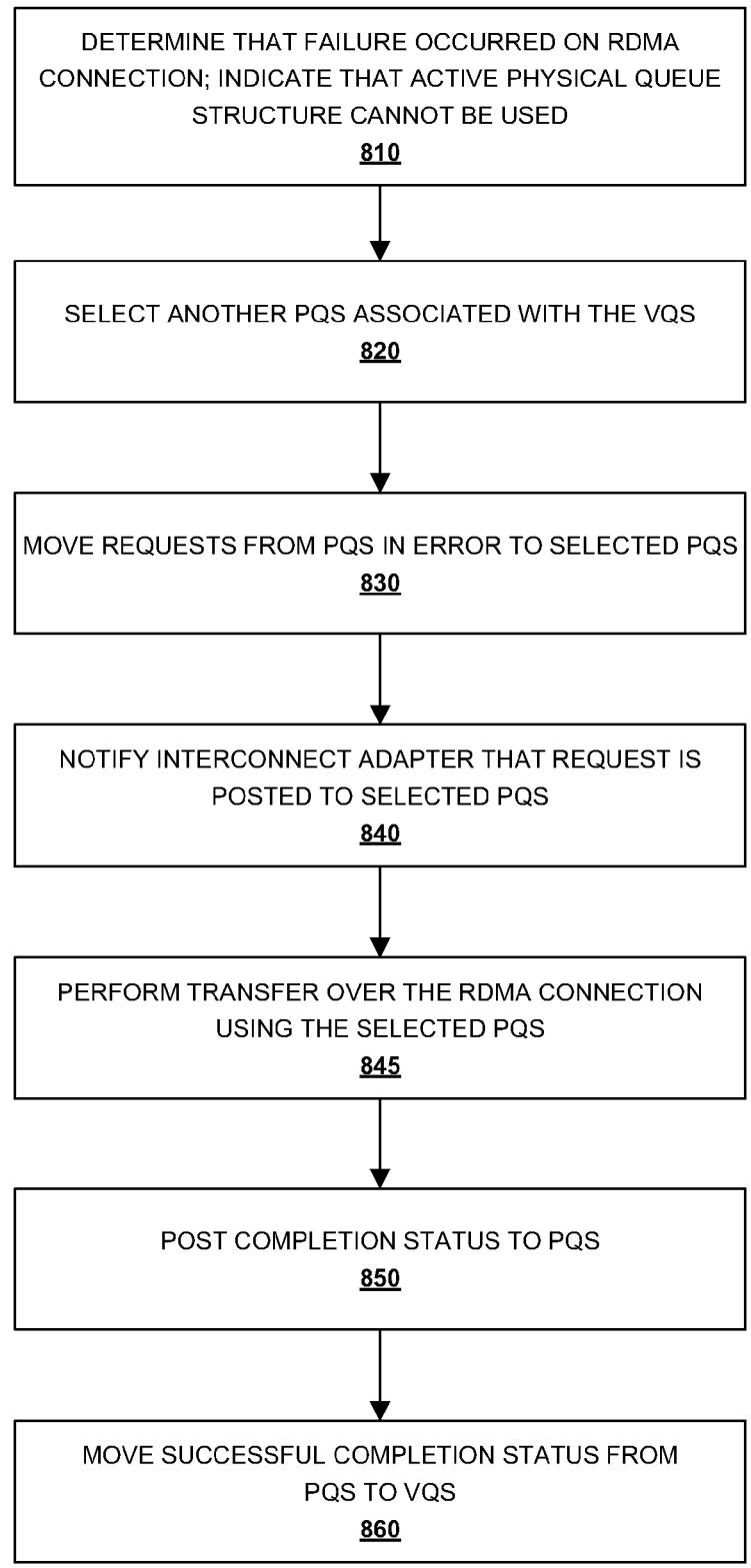
FIG. 8 is a flow diagram illustrating a failover mechanism of an RDMA connection according to inventive embodiments described herein.

At this point, it is useful to describe various methods performed by the novel failover virtual layer 322. The description that follows is divided into three sections. The "Creation of Virtual and Physical QSs" section describes novel mechanism of creation of virtual QSs and physical QSs and associating virtual queue structures with physical queue structures. The "Data Transfer on RDMA Connection" section describes a novel process of servicing a request over a network using RDMA connection. The "Failover of RDMA Connection" section discusses failover of RDMA connection when an error is detected. It should be noted that each section recites multiple steps, as will be described in reference to FIGS. 6 through 8.

Creation of Virtual and Physical QSs

Figure 6:
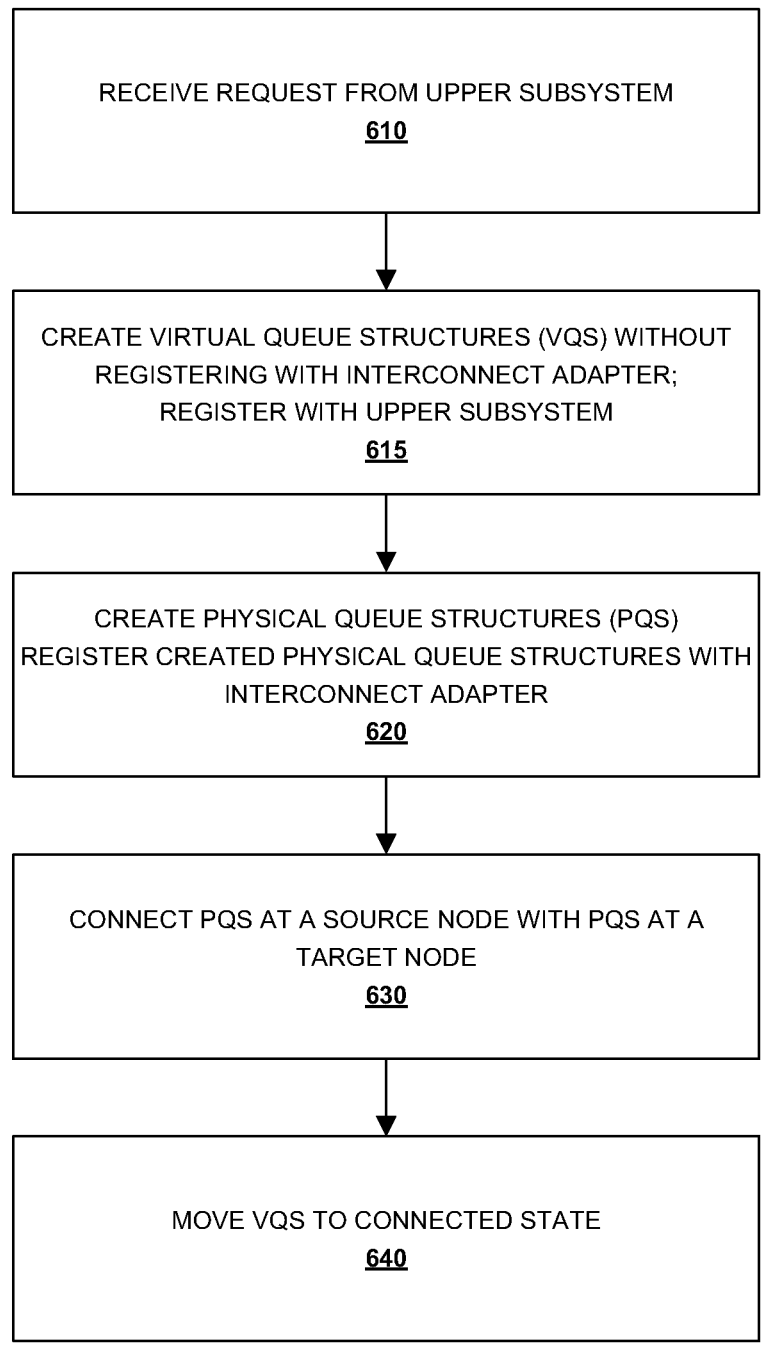
FIG. 6 is a flow diagram illustrating a process of establishing an RDMA connection between two nodes shown in FIG. 1 according to inventive embodiments described herein.

Referring now to FIG. 6, a flowchart is provided to illustrate various steps to generate virtual queue structures (VQS) and to connect virtual queue structures and physical queue structures with remote virtual queue structures and physical queue structures. Initially, at step 610, the virtual queue structure management module receives a request from the upper subsystem to create a QS for data transfer to and from its peer upper subsystem at the target node.

In response to the request, virtual QS management module creates a virtual queue structure by allocating memory buffers in memory (e.g., 224) for the queue structure, which may include a send queue, a receive queue, and a completion queue (step 615). Virtual queue structure management module provides queue structure attributes, such as a queue size. Importantly, the virtual queue management module does not register the created virtual queue structures with the interconnect adapter, which essentially means that the addresses of the virtual queues in memory are not communicated to the interconnect adapter. As described herein, "registering queue structures with the interconnect adapter" means communicating the memory addresses of the queue structures to the interconnect adapter. Thus, the interconnect adapter cannot access VQS and VQSs are used as a staging area before the requests are posted to the physical queues.

Once the virtual queue structures are created, the virtual queue structure management module notifies the upper subsystem module and returns a handle associated with the virtual queue structure. Such a handle is used to uniquely identify the virtual queue structure. It should be noted that module 370 can create as many virtual queue structures as the memory capacity permits.

At step 620, virtual queue structure management module 370 at a source node creates physical queue structures and registers the physical queue structures with the interconnect adapter at the first computer node. Registering physical queue structures with the interconnect adapter means communicating the memory addresses of the queue structures to the interconnect adapter. Other information that is typically passed to the interconnect adapter upon queue structure creation may include capabilities of the queues and the number of requests supported. It should be noted here that unlike known implementations, which were described in reference to FIG. 3A, the upper subsystem modules are not aware of the physical queue structures created by the virtual queue structure management module. Thus, from the upper subsystem standpoint, only virtual queue structures are created. This distinction is important since an error on a physical queue structure is not communicated to the upper subsystem modules directly, as described in more detail herein.

Still with reference to FIG. 6, at step 630, after the upper subsystem module receives the handle uniquely identifying the created virtual queue structure(s), such as ID, the upper subsystem initiates connection between the two or more nodes through the virtual queue structure management module. In the known prior art implementations, a physical queue structure at a source node is connected with a physical queue structure on a target node over the network. However, since the inventive techniques create both virtual queue structures and physical queue structures, module 370 initiates connection between a virtual queue structure at the source node and a virtual queue structure at the target node. During the connection negotiation process, virtual queue structure management module starts the queue structure connection process on a selected physical queue structure from the pool. The actual connection negotiation is performed using well-known client-server connection processes by which a first node sends a request to a second node, which is listening on one of its ports. During the process, the first node and second node exchange information to establish the connection. Once the connection is created among queue structures at the first and second node connected over the RDMA interconnect, virtual queue structure management module is notified.

Once the connection between a source node and a target node is established, the virtual queue structure management module 370 selects a physical queue structure that is in the active state and associates each VQS with one or more physical QSs (step 640). Associating a virtual queue structure with one or more physical queue structures (which are registered with the interconnect driver) may involve selecting an active physical queue structure from a pool of physical queue structures and providing a reference from the virtual QS to the active physical QS, for example, in a data structure (e.g., 500).

Module 370 keeps information about each queue structure. To this end, in one implementation, the Virtual QS management module queries data structure 500 shown in FIG. 5 to determine the state of the queue structures. Once at least one physical queue structure on the first node is connected to a physical queue structure at the second node, the virtual queue structures are said to be connected and the upper-subsystem module is notified.

Figure 5A:
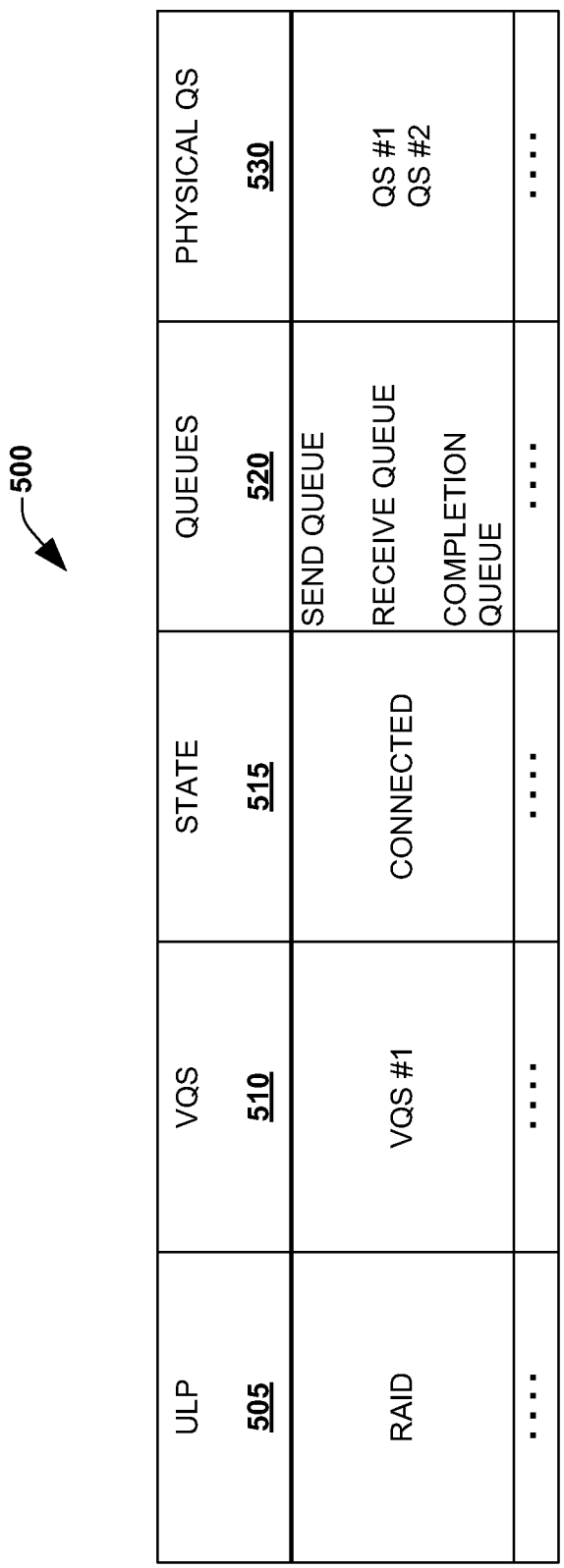
FIG. 5A is a block diagram of an exemplary data structure for storing information about virtual queue structures and association between virtual queue structures and one or more physical queue structures according to inventive embodiments described herein.

Now with reference to FIG. 5A, data structure 500 for storing information about virtual queue structures and association between virtual queue structures and physical queue structures according to novel embodiments is illustrated. Such a data structure can be stored in memory 224. Those skilled in the art would understand that although data structure 500 illustrates specific fields, other fields can be included in data structure 500. Similarly, some of the fields can be omitted in other implementations.

Field 505 stores information about an upper subsystem module that posted a request to the virtual QS management module. Such a subsystem module can be a file system, a RAID subsystem, or any other subsystem on the node). Those skilled in the art should understand that any number of virtual QSs can be created.

Field 510 maintains a unique identifier (ID) of a virtual queue structure (VQS). Such an ID is assigned to the VQS upon its creation by e.g., virtual queue structure management module. The upper subsystem obtains the ID of the VQS when it is created and uses the VQS ID to submit a request to the queue structure and to check if any request submitted to the VQS is completed.

Field 515 maintains the state of a virtual queue structure. The state can be, for example, CONNECTED, ERROR, or IDLE. According to one embodiment, as long as a physical queue structure associated with a virtual queue structure is in a CONNECTED state, VQS state is CONNECTED.

Field 520 maintains information about a type of a queue on the virtual queue structure. As described herein, RDMA protocol uses a send, receive, and a completion queues to send requests, post receive buffers, and maintain a completion status, respectively.

Field 530 maintains information about physical queue structures associated with the virtual queue structures as will be described in connection with FIG. 5B where data structure 502 storing information about physical QSs is shown.

An exemplary entry in data structure 500 is illustrated. As shown in FIG. 5A, an exemplary entry includes a name of an upper subsystem module that initiated the RDMA connection (i.e., RAID), the VQS ID number (e.g., VQS#1), the state of the VQS (CONNECTED), a send queue, a receive queue, and a completion queue. The data structure further includes field 530 storing unique IDs of physical queue structures associated with the virtual queue structure.

Exemplary data structure 502 storing information about physical QSs is illustrated in FIG. 5B. Field 535 maintains an ID of a physical QS, field 540 maintains information about a state of a physical queue structure. The state can be, for example, CONNECTED, ERROR, or IDLE. Additional status information in data structure 502 may include a status of a physical queue structure, i.e., ACTIVE or STANDBY. As used herein, an active queue structure is the physical queue structure that is used to perform data transfer while the standby queue structure is a physical queue structure that is not used in the data transfer. As will be described in more detail below, the distinction between an active and standby queue structure is important since according to novel embodiments described herein, when an active queue structure is in error, a request is posted to a standby queue structure, which essentially becomes an active queue structure. This way the connection does not need to be reestablished or worse yet the error does not need to be propagated to the upper subsystem module that initiated the data transfer.

Field 550 maintains information about a type of the queue on the physical queue structure, such as a send, receive, or completion queue. An exemplary entry in data structure 502 may include an ID of the physical QS, a status (such as CONNECTED and ACTIVE or CONNECTED and STANDBY). The entry may include an ID of the request queues (such as send and receive queues). Status of the completion queue (such as having completions or Empty) can be determined by looking at the completion queue. "Empty" indicates that the completion result was moved to a completion queue of a VQS.

Those skilled in the art would understand that although two data structures (e.g., 500 and 502) are illustrated for storing information about virtual and physical queue structures, in other implementations, one data structure combining information about virtual and physical QSs can be used.

Once the connection is established and the virtual queue structures are associated with one or more physical queue structures, module 370 notifies the upper subsystem module that it is ready to perform a data transfer.

Data Transfer on RDMA Connection

In one implementation, the steps described herein are performed by the upper subsystem, the virtual queue structure management module residing within the failover virtual layer at node 200*a* and the interconnect adapter. Those skilled in the art would appreciate that these steps can be performed by other components within a node. RDMA write operation is used as an example in this section.

Initially, at step 705, failover virtual layer, specifically, the queue structure management module 370 receives a request from the upper subsystem module (such as a file system, RAID, or any other subsystem of node 200). In one embodiment, the request includes an address in memory at a first node where data are stored and an address in memory at a second node where data to be written. The nature of the data to be transferred depends on the type of the RDMA operation initiated by the upper subsystem module. For example, in one implementation, the data may represent write logs to be transferred from node 200*a* to node 200*b*. In other implementations, the data may include the node status information to be directly transferred to a memory of a partner node. Yet in other applications, the data may include changes to data blocks on the node 200*a* to be transferred directly to node 200*b*. Importantly, such data will be sent over a network from a memory of node 200*a* directly to a memory of node 200*b* over RDMA connection. In one embodiment, upon receiving the request from the upper layer module, module 370 gathers the source address and the destination address from the request and generates a local request based on this information. The local request may include the source address, the destination address, and length of the memory region. Module 370 then posts the local request to either a send or receive queue of the virtual queue structure in memory (step 710). In addition, module 370 posts the request to the send or receive queue of the active physical queue structure physical queue structure in memory (step 720). The active physical queue structure physical queue structure is associated with the VQS. As used herein, posting the request means copying the request to the memory location of a queue. In one implementation, the request scheduling module 360 helps to identify an active physical QS where the request can be posted.

Upon posting the request in the VQS and physical QS, module 370 notifies (step 725) the interconnect driver 350 that a request is posted to the active physical queue structure (which was selected by the request scheduling module, for example) by, i.e., providing an address in memory of the active physical queue structure. The interconnect driver 350, in turn, notifies the interconnect adapter 232 that the request is posted. The interconnect adapter is only aware of the physical QSs created in memory and does not have knowledge about the created VQSs.

The interconnect adapter, in turn, uses the address of the active physical queue structure to access the request in the physical QS. The interconnect adapter then obtains the source memory address of the data from the physical QS on the first node. The interconnect adapter then composes a data packet, which includes a source address, destination address, and data. The interconnect adapter then performs transfer of the data packet over the established RDMA connection to the second node (step 730). When the data packet arrives at the second node, the interconnect adapter at the second node uses the destination address in the request to write the data directly to the memory at the second node. The interconnect adapters 232*a, b* (shown in FIG. 1) at the first node and at the second node use RDMA protocol primitives to communicate. Thus, when the data are written to the memory at the second node, the interconnect adapter 232*b* at the second node communicates to the first node the completion status. The interconnect adapter 232*a* at the first node (i.e., node 200*a*), in one implementation, stores the completion status in the completion queue of the active physical queue structure (step 735). The interconnect adapter 232*a* at the first node posts the completion status to the completion queue of the active physical queue structure rather than in that of the virtual queue structure since it is not aware of the virtual QS. As a corollary of this, while the interconnect adapter is aware of the status of the request completion, the upper subsystem module that created the request does not become aware of the request completion until after the completion status is moved to the completion queue of the virtual queue structure associated with the active physical queue structure, as further explained.

At step 740, request scheduling module examines the completion status. If the completion status is successful, i.e., the data transfer took place, request completion module moves the completion status from the completion queue of the active physical queue structure and puts it in the completion queue of the virtual queue structure. Now that the completion status is moved to the completion queue of the virtual queue structure, the upper subsystem module can examine the completion queue of the virtual queue structure. Thus, according to novel techniques described herein, the upper subsystem modules can become aware of the successful completion of the RDMA transfer only after the completion request is moved to the VQS accessible to the upper subsystems. As used herein, the term "accessible" means that the upper subsystems are configured to receive memory addresses of virtual queue data structures. If the completion status is a "failure", the upper subsystem does not learn about the failover while the virtual QS management module performs failover of RDMA connection from one physical connection to another physical connection without disrupting the upper subsystem. Novel steps for providing non-disruptive failover of RDMA connection are described below in connection with FIG. 8

Failover of RDMA Connection

Monitoring module 380 of the failover virtual layer periodically polls physical QSs in the pool of QSs to determine if any of the QSs are in error. Monitoring module 380 is in one implementation the recipient of all connection status notifications from the interconnect adaptor as well. If module 380 sees that one of the QSs is in error, it provides an indication that this particular QS cannot be used (step 810). In one implementation, such an indication can be provided in data structure 502, which maintains information about QSs. Request scheduling module 360 selects other physical QSs, which are associated with the virtual QS (step 820). To this end, in one implementation, module 370 queries data structure 500 to identify other physical QSs associated with the virtual QS, which are not in the error state. Virtual QS management module prepares a standby physical QSs associated with the virtual QS to accommodate possible non-disruptive failover process in the future. For example, exemplary entry for physical QS#2 in data structure 502 indicates that it is in a standby state. Upon finding another physical QS, module 360 makes this QS an active QS, by for example, moving outstanding requests from the physical QS in error to the new active physical QS (step 830). Moving the outstanding requests from one QS to another QS means copying the requests from one QS to another QS. Importantly, the upper subsystem does not have any information about the error that occurred on the active QS because the upper subsystem is not aware of the physical QSs created by module 370. After selecting a new active physical QS to perform the RDMA transfer, virtual QS management module 370 notifies the interconnect driver that the request is posted to another physical QS. The interconnect driver, which manages the interconnect adapter, communicates to the interconnect adapter that the request is posted to a new physical QS (step 840). In one implementation, the interconnect adapter obtains a memory handle of the active physical QS where the request is stored. The interconnect adapter uses the memory handle to access the request. The interconnect adapter 232a at the first computer node then uses the source address indicated in the request to access data in memory. The interconnect adapter then composes a data packet, which includes the source address, destination address, and data. The interconnect adapter sends the data packet over the RDMA connection (step 845), which was earlier established.

Once the request is completed, the interconnect adapter 232a at the source node receives an indication from interconnect adapter 232b at the second node. The interconnect adapter 232a at the first node updates the completion queue of the active physical QS where the outstanding requests were moved (step 850).

Once the completion status is posted to the physical QS, scheduling module accesses the completion queue of the physical QS where the requests were moved, determines that the completion status is successful, and moves the completion status to the completion queue of the virtual QS (step 860). Upper subsystem periodically polls the completion status of the virtual QS. Thus, the upper subsystem learns that the request was successfully completed. Since the upper subsystem does not have any knowledge that a physical QS was in error and another physical QS was selected to perform the RDMA transfer, the upper subsystem continues creating requests for data transfer and providing them to the virtual QS management module without interruption. As a corollary to this, the failover mechanism performed by module 370 does not cause disruption to the upper subsystem.

Although embodiments described herein, for the purpose of explanation, have been described with reference to specific exemplary embodiments, it will be understood that the embodiments describe herein are not limited to any specific implementation. For example, embodiments described herein can be practiced on any device. A person of ordinary skill in the art would understand that the inventive principles can be practiced with modifications and alternations to those embodiments or can be practiced in other embodiments within the spirit and scope of the appended claims. Also, those skilled in the art should note that the terms "source node", "first storage system", and "first computer node" or "first node" are used interchangeably herein. Similarly, the terms "destination node", "target node", and "second computer node" are used interchangeably herein. Unless specifically stated otherwise, it is to be appreciated that throughout the discussions utilizing terms such as "processing" or "computing" or "determining" or the like refer to the action and processes of a computer system or similar electronic computing device that manipulates and transforms data represented as physical (e.g. electronic) quantities within the computer systems registers and memories into other data similarly represented as physical quantities within the computer system.

The present novel embodiments described herein can be implemented by apparatuses for performing the operations herein. These apparatuses may be specially constructed for the required purposes or they may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, flash storage devices, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A system for performing non-disruptive failover of an RDMA connection between a first computer node and a second computer node, the system comprising:

an upper subsystem module at the first computer node configured to create a request; and a failover virtual layer in communication with the upper subsystem module at the first computer node, the failover virtual layer configured to establish the RDMA connection between the first computer node and the second computer node, to detect an error on the RDMA connection and perform a failover of the RDMA connection so that the upper subsystem module does not have knowledge of the error on the RDMA connection and the upper subsystem module continues providing requests to the failover virtual layer while the RDMA connection sustained the error, wherein the failover virtual layer is further configured to create at least one virtual queue structure (VQS), a VQS accessible by the upper subsystem module and not accessible by an interconnect adapter at the first computer node.

2. The system of claim 1, wherein the failover virtual layer is further configured to create at least two VQSs.

3. The system of claim 1, wherein the failover virtual layer is further configured to create a physical queue structure (PQS) associated with the VQS.

4. The system of claim 1, wherein the failover virtual layer is further configured to:
receive a completion status from the interconnect adapter;
post the completion status at a physical queue structure (PQS); and
responsive to the completion status being successful, move the completion status to the VQS, the VQS associated with the PQS.

5. A system for performing non-disruptive failover of an RDMA connection between a first computer node and a second computer node, the system comprising:
an upper subsystem module at the first computer node configured to create a request, the request including a source memory address of data to be read over the RDMA connection and a destination memory address to store data to; and
a failover virtual layer configured to create at least one virtual queue structure (VQS), a VQS accessible by the upper subsystem module and not accessible by an interconnect adapter at the first computer node, the failover virtual layer further configured to create at least two physical queue structures (PQSs) associated with the VQS, the PQSs not accessible by the upper subsystem module.

6. The system of claim 5, wherein the interconnect adapter is configured to perform data transfer between the first computer node and the second computer node over the RDMA connection.

7. The system of claim 5, further comprising an interconnect driver configured to manage the interconnect adapter.

8. The system of claim 5, wherein the interconnect adapter is configured not to receive a memory address of the VQS and is configured to receive memory addresses of the physical queue structures.

9. The system of claim 5, wherein the upper subsystem module comprises at least one of a file system or a RAID system.

10. The system of claim 5, wherein the failover virtual layer comprises:
a VQS management module configured to create the VQS and the PQSs and to perform failover of a PQS in error;
a request scheduling module configured to facilitate load balancing of requests among active PQSs; and
a monitoring module configured to monitor the PQSs to determine if one or more PQSs are in error.

11. The system of claim 5, wherein at least one of the VQS or the PQSs at the first computer node comprise one or more of:
a send queue configured to store RDMA read, RDMA write and send requests;
a receive queue configured to store receive requests; or
a completion queue configured to store a status of a RDMA transmission.

12. The system of claim 5, further comprising a data structure for storing information about the VQS and the PQSs.

13. The system of claim 12, wherein the data structure further maintains information about one or more PQSs in error.

14. A method for performing an RDMA transfer between a first computer node and a second computer node, the method comprising:
creating at least one virtual queue structure (VQS) in a memory at the first computer node, a VQS for storing data transfer requests and completion status;
providing a handle of the VQS to an upper subsystem module so that the upper subsystem module is adapted to access the VQS using the handle while an interconnect adapter at the first computer node is not adapted to access the VQS, the upper subsystem module configured to provide the data transfer requests;
creating two or more physical queue structures (PQSs) in the memory;
registering the PQSs with the interconnect adapter so that the interconnect adapter is adapted to access the PQSs and the upper subsystem is adapted not to access the PQSs;
associating the VQS with the PQSs;
connecting the VQS at the first computer node with a second VQS at the second computer node; and
connecting the PQS at the first computer node with a second PQS at the second computer node.

15. The method of claim 14, wherein associating the VQS with the PQSs further comprises selecting an active PQS having an active status and providing a reference from the VQS to the active PQS.

16. A method for performing non-disruptive failover of an RDMA connection between a first computer node and a second computer node, the method comprising:
receiving a request from an upper subsystem module, the request may include source and destination memory addresses;
posting the request to a virtual queue structure (VQS) associated with two or more physical queue structures (PQS) and posting the request to a first PQS, the VQS accessible to the upper subsystem module and not accessible to an interconnect adapter at the first computer node;
accessing the first PQS to obtain the source and destination memory address;
sending data over the RDMA connection between the first computer node and the second computer node;
responsive to determining that an error occurred on the RDMA connection, identifying a second PQS associated with the VQS, the second PQS not in error;
moving the request from the first PQS to the second PQS associated with the VQS;
using the second PQS to perform data transfer over the RDMA connection without notifying the upper subsystem module of the error so that the upper subsystem module continues posting requests to the VQS;
posting a completion status in the second PQS at the first computer node; and
responsive to the completion status being successful, moving the completion status to the VQS, thereby making the upper subsystem module aware of the successful completion.

17. A method for performing non-disruptive failover of an RDMA connection between a first computer node and a second computer node, the method comprising:
receiving a data transfer request from an upper subsystem module;

providing a failover virtual layer at the first computer node and the second computer node, the failover virtual layer at the first computer node and the second computer node configured to establish an RDMA connection between the first computer node and the second computer node, to receive the data transfer request and to perform a failover of an RDMA transfer without notifying the upper subsystem module so that the upper subsystem module continues providing data transfer requests to the failover virtual layer; and creating at least one virtual queue structure (VQS), a VQS accessible by the upper subsystem module and not accessible by an interconnect adapter at the first computer node.

18. The method of claim 17, further comprising creating at least two VQSs.

19. The method of claim 17, further comprising creating at least two physical queue structures (PQS) associated with the VQS.

20. The method of claim 19, further comprising:
receiving a completion status from the interconnect adapter at the first computer node;
posting the completion status at a PQS; and
responsive to the completion status being successful, moving the completion status to the VQS associated with the PQS.

21. The method of claim 19, further comprising:
receiving a completion status from the interconnect adapter at the first computer node;
posting the completion status at a PQS; and
responsive to the completion status being a failure, identifying a second PQS not in error and moving the requests to the second PQS without notifying the upper subsystem module.

22. The method of claim 17, wherein the data transfer request corresponds to write logs to be transferred from the first computer node to the second computer node.

23. The method of claim 17, wherein the data transfer request corresponds to data blocks to be transferred from the first computer node to the second computer node.

24. A high availability (HA) cluster system for performing non-disruptive failover of an RDMA connection between a first storage node and a second storage node engaged in a transfer of write logs, the system comprising:
an upper subsystem module at the first computer node configured to create a request for the transfer of write logs, the request including a source memory address of write logs to be transferred over the RDMA connection and a destination memory address at the second computer node; and a failover virtual layer in communication with the upper subsystem module at the first computer node, the failover virtual layer configured to establish the RDMA connection between the first computer node and the second computer node, obtain the write logs from memory and store the write logs to a memory of the second storage node, detect an error on the RDMA connection and perform a failover of the RDMA connection so that the upper subsystem module does not have knowledge of the error on the RDMA connection, wherein the failover virtual layer is further configured to create at least one virtual queue structure (VQS), a VQS accessible by the upper subsystem module and not accessible by an interconnect adapter at the first computer node.

25. A computer-program product comprising a non-transitory computer-readable medium having computer program code embodied thereon for performing an RDMA transfer between a first computer node and a second computer node, the computer program code adapted to:
create at least one virtual queue structure (VQS) in a memory at the first computer node, a VQS for storing data transfer requests and completion status;
provide a handle of the VQS to an upper subsystem module so that the upper subsystem module is adapted to access the VQS using the handle while an interconnect adapter at the first computer node is not adapted to access the VQS, the upper subsystem module configured to provide the data transfer requests;
create two or more physical queue structures (PQSs) in the memory;
register the PQSs with the interconnect adapter so that the interconnect adapter is adapted to access the PQSs and the upper subsystem is adapted not to access the PQSs;
associate the VQS with the PQSs;
connect the VQS at the first computer node with a second VQS at the second computer node; and
connect a PQS at the first computer node with a second PQS at the second computer node.

* * * * *